US010908928B2

(12) United States Patent
Umapathy et al.

(10) Patent No.: US 10,908,928 B2
(45) Date of Patent: Feb. 2, 2021

(54) RULES-BASED WORKFLOW MESSAGING

(71) Applicant: Adobe Inc., San Jose, CA (US)

(72) Inventors: Thangaraj Umapathy, Bangalore (IN); Madan Kumar Bangalore Nanjundaiah, Bangalore (IN); Arun Bose, Kollam (IN)

(73) Assignee: Adobe Inc., San Jose, CA (US)

( * ) Notice: Subject to any disclaimer, the term of this patent is extended or adjusted under 35 U.S.C. 154(b) by 844 days.

(21) Appl. No.: 14/751,449

(22) Filed: Jun. 26, 2015

(65) Prior Publication Data

US 2016/0380915 A1    Dec. 29, 2016

(51) Int. Cl.
    *G06F 9/451* (2018.01)
(52) U.S. Cl.
    CPC .............. *G06F 9/451* (2018.02); *G06F 9/453* (2018.02)
(58) Field of Classification Search
    CPC ..... H04L 43/0817; G06F 9/3812; G06F 9/38; G06F 9/46; G06F 3/048; G06F 3/04812
    See application file for complete search history.

(56) References Cited

U.S. PATENT DOCUMENTS

| 10,884,769 | | 1/2021 | Chandan et al. | |
| 2007/0100990 A1* | | 5/2007 | Brown ................ | H04L 43/0817 709/224 |
| 2010/0058233 A1* | | 3/2010 | Chan ....................... | G06F 9/451 715/810 |
| 2013/0097498 A1* | | 4/2013 | Steinberg ............. | G06F 3/04892 715/708 |
| 2013/0232254 A1* | | 9/2013 | Srikanth ............. | H04L 43/0876 709/224 |
| 2016/0092085 A1* | | 3/2016 | Kitner ................... | G06F 3/0488 715/738 |

* cited by examiner

*Primary Examiner* — Philip J Chea
*Assistant Examiner* — Mohammed Ahmed
(74) *Attorney, Agent, or Firm* — SBMC

(57) ABSTRACT

Techniques for rules-based workflow messaging are described herein. In one or more implementations, user activity with different existing workflows for features of an application is tracked and communicated to a tracking service. Based on analysis of user activity, rules are derived regarding messages to show users with respect to new features that relate to user interaction. For example, activity data indicating heavy usage of a particular legacy workflow is used to recognize that users are not discovering/using a corresponding new feature. Based on such usage patterns, workflow messages and rules for exposing the messages for the new feature are created and distributed to clients. The rules are applied to detect workflow patterns and trigger messages regarding corresponding new features. In response to an indication of interest in a new feature, interactive instructions to guide users step-by-step through the workflow for a new feature are provided.

20 Claims, 6 Drawing Sheets

RULES-BASED WORKFLOW MESSAGING

BACKGROUND

Individuals may interact with various computing resources, such as desktop applications or web applications available from service providers, to create and publish web development projects (e.g., mark-up language documents, web pages, web applications, web sites, etc.). Traditionally, text-based editors operated by sophisticated users having detailed knowledge of HTML and other programming languages were employed for web page development. Since text-based editing may be complicated and tedious, visual-based editors were developed in which users may create pages by laying-out elements in a "what you see is what you get (WYSIWYG) interface. The visual-based editors are designed to modify underlying documents for the web development project in response to manipulation of elements in the WYSIWYG view, and accordingly users are able to create projects visually without having detailed programming knowledge.

One challenge associated with visual-based editors is informing users regarding new features and getting user to adopt the features in appropriate circumstance. For example, users may be unaware of new features that can simplify tasks such as setting element properties, or may be reluctant to use a new feature since the user is not familiar with the workflow for the new feature. Consequently, users often continue to use older techniques that the users are accustomed to using even though new options that can make tasks quicker, easier, and/or more effective may be available. Traditionally, developers and product teams provide blogs, videos manuals, media presentations, and other new feature documentation that is designed to enable users to learn about new features and provide instruction on how to use those features. Unfortunately, many users will not take the time to read and understand such new feature documentation. Consequently, traditional documentation approaches may not be very effective at promoting new features and workflows and it can take a considerable amount of time for users to discover and adopt new program features.

SUMMARY

Techniques for rules-based workflow messaging are described herein. In one or more implementations, user activity with different existing workflows for an application is tracked and communicated to a tracking service. Based on analysis of user activity, rules are derived regarding messages to show users with respect to new features of the application that relate to user interaction. For example, user activity data indicating heavy usage of a particular legacy workflow can be used to recognize that users are not readily discovering/using a corresponding new feature/workflow. Based on the usage patterns, workflow messages and rules for exposing messages related to the new feature/workflow can be created and distributed to clients. The rules are applied by the clients to detect workflow patterns and trigger messages regarding corresponding new features. In response to an indication of interest in a new feature, interactive instructions to guide users step-by-step through the workflow for the new feature may be provided.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

One challenge associated with visual-based editors and other applications is informing users regarding new features and getting users to adopt the features in appropriate circumstance. For example, users may be unaware of new features and additionally users often continue to use older techniques that the users are accustomed to using even though new options are available to make tasks quicker, easier, and/or more effective.

Techniques for rules-based workflow messaging are described herein. In one or more implementations, user activity with different existing workflows for a client application is tracked and communicated to a tracking service. Based on analysis of user activity by the tracking service, rules are derived to define and control messages that get shown users with respect to new features that relate detected user interaction. For example, user activity data indicating heavy usage of a particular legacy workflow can be used to recognize that users are not readily discovering/using a corresponding new feature/workflow. Based on such usage patterns, workflow messages and rules for exposing messages related to the new feature/workflow can be created and distributed to client. The rules can be distributed to clients and dynamically updated as more usage tracking data becomes available. The rules are applied by the clients to detect workflow patterns and trigger messages regarding corresponding new features. In response to an indication of interest in a new feature, interactive instructions to guide users step-by-step through the workflow for the new feature may then be provided. In one approach, workflow message packages that include data regarding rules, messages, and interactive instructions are produced based on collected activity data and distributed to clients to implement the workflow messaging.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Operating Environment

Figure 1:
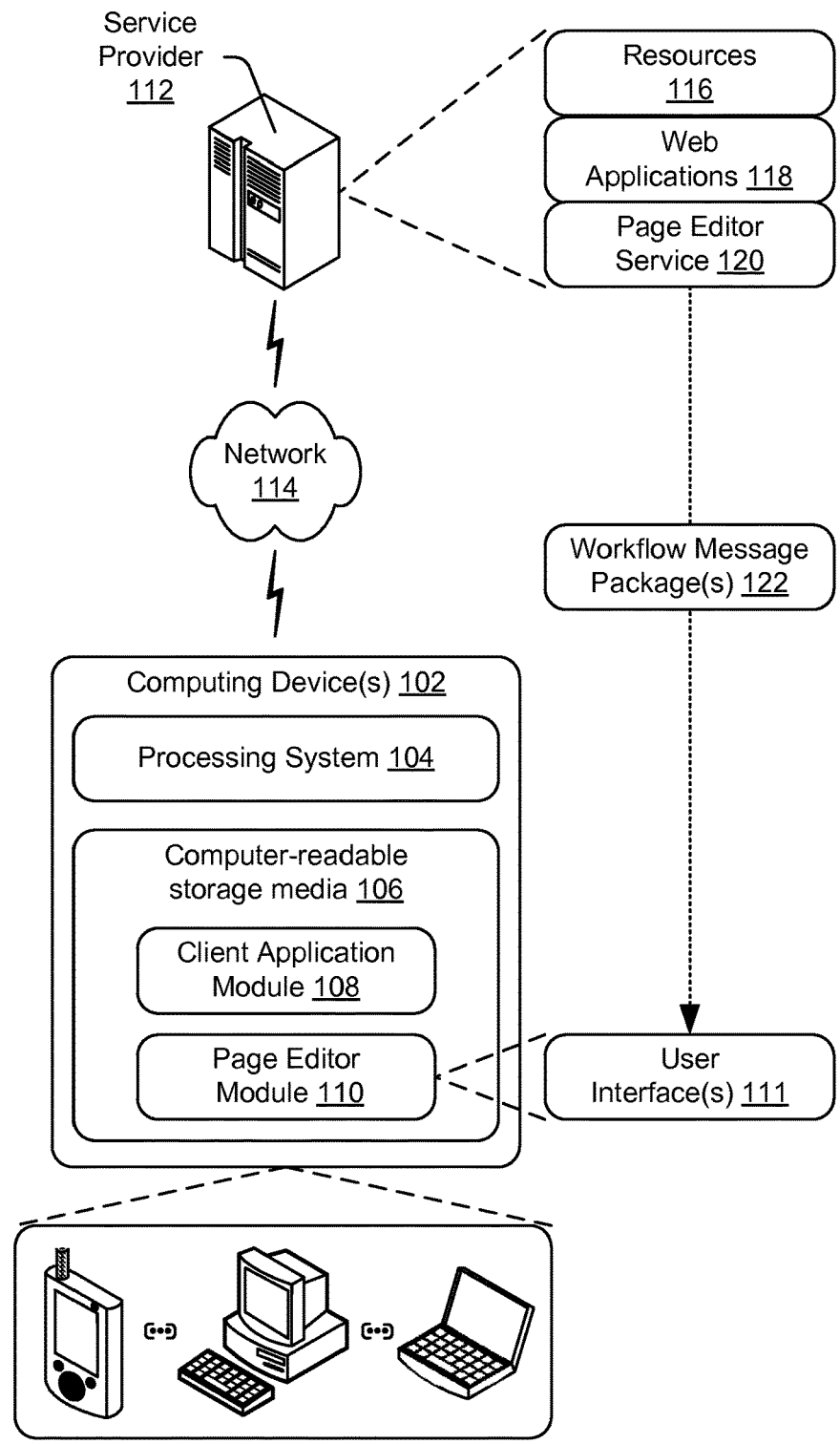
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may also include or make use of page editor module 110 that represents functionality operable to implement techniques for DOM reference synchronization described above and below. The page editor module 110 may be configured as a web design and development application to facilitate creation and publishing of web development projects (e.g., mark-up language documents, web pages, web applications, web sites, etc.), one example of which is Adobe™ Dreamweaver™. Other web development suites, HTML editors, and design packages are also contemplated. In general, the page editor module 110 is configured to provide access to a variety of integrated tools for web development via one or more user interfaces 111 associated with the page editor. The page editor module 110 may provide both a visual "WYSIWYG" editor (e.g., a rendered view or "design" view) and a text-based code editor (e.g. a structure view,) in which a hierarchal representation of elements within pages may be viewed and manipulated. By way of example and not limitation, the document object model (DOM) structure for a page may be presented and edited via a structure view of the text-based code editor. Although DOM is referred to in various examples above and below, other hierarchal representations of elements are also contemplated such as various mark-up language, object-based, and script documents used to define the properties, behaviors, and structure of pages for a web development project. In one or more implementations, the rendered view and structure view may be associated with separate and distinct processes.

The page editor module 110 may provide features including but not limited to syntax highlighting, code completion, code collapsing, syntax checking and code hints. The rendered view or "design" view enables visual editing for page layout and automatic code generation without deep knowledge of programming languages and techniques. The rendered view may be provided via an integrated browser component. In addition or alternatively, browser extensions may be employed to preview content via other locally installed web browsers (e.g., Internet Explorer™ Chrome™, Firefox™, Safari™, etc.) within the user interface 111 of the page editor module 110 or via a separate window/user interface. Extensions may be provided as native extensions from a developer of the page editor module 110 or as third-party browser extensions.

The page editor module 110 may be implemented as a software module, a hardware device, or using a combination of software, hardware, firmware, fixed logic circuitry, etc. The page editor module 110 may be implemented as a standalone component of the computing device 102 as illustrated. In addition or alternatively, the page editor module 110 may be configured as a component of the client application module 108, an operating system, or other device application. For example, the page editor module 110 may be provided as a plug-in or downloadable script for a browser. The page editor module 110 may also represent script contained in or otherwise accessible via a webpage, web application, a web-based service, or other resources made available by a service provider.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and processing resources (e.g., mobile devices). Additionally, although a single computing device 102 is shown, the computing device 102 may be representative of a plurality of different devices to perform operations "over the cloud" as further described in relation to FIG. 6.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web applications 118 represent one particular kind of resource 116 that may be accessible via a service provider 112. As mentioned, web applications 118 may be operated over a network 114 using a browser or other client application module 108 to obtain and run client-side code for the web application. In at least some implementations, a runtime environment for execution of the web application 118 is provided by the browser (or other client application module 108). The runtime environment supports web applications 118 that may be written using dynamic scripting languages, such as JavaScript, hypertext markup language revision 5 and cascading style sheets (HTML5/CSS), and extensible application mark-up language (XAML). Script-based web applications may operate through corresponding runtime environments supported by a device that are configured to provide respective execution environments for corresponding applications. The runtime environments may provide a common set of features, routines, and functions for compatible applications thereby offloading coding of common tasks from application development. Thus, the runtime environment can facilitate portability of web applications to different kinds of systems and architectures with little or no change to the script for the applications. Various types of runtime environments may be employed including but not limited to JAVA™ runtime environment (JRE) and Adobe™ Flash™, to name a few examples.

The service provider is further illustrated as including a page editor service 120. The page editor service 120 is representative of server-side functionality operable to support techniques for web project development including various techniques to support rule-based workflow messaging described herein. For instance, the page editor service 120 may be configured to perform functionality that is described herein in relation to the page editor module 110 as a web-based service. In particular, the page editor service 120 may be configured to enable editing, workflow messaging, and other operations as described above and below in connection with web applications 118 and client application modules 108 over the network 114. Moreover, the page editor service 120 may be configured to distribute page editor modules 110 for use by clients, such as by making the modules available for downloading over the network 114, communicating the modules to computing devices for use with client application modules 108, and so forth.

Additionally, the page editor service 120 is operable to provide various functionality for workflow messaging as described in this document. By way of example and not limitation, the page editor service 120 can include, interact with, or otherwise make use of components configured to collect activity data regarding user behavior with a page editor module 110 or other application, analyze the data to recognize underutilized workflows, and create rules and interactive instructions for workflow messaging. Further, the page editor service 120 can produce workflow packages 122 for distribution to clients. The workflow packages 122 contain data regarding rules, interactive instructions, and workflows that is sufficient to enable implementation of workflow messaging by the clients. In particular, rules provided via the workflow packages 122 are used by clients to recognize legacy interactions and trigger corresponding messages regarding new features and alternative for completing tasks. Generally, workflow messaging is triggered when user interaction is detected that matches a particular pattern and criteria specified by the rules. Various kinds of messages can be exposed via a user interface 111 to notify a user regarding the new features, examples of which include but are not limited to one or more of message boxes, pop-up elements, a menu bar notification, an icon graphic indicator, a toast message or slide-out instrumentality, alerts sounds, animations, or other user interface instrumentalities suitable to provide messages regarding new/alternative features. Optionally, elements through which messages are exposed may be selectable to expand the notification and/or launch a dialog to provide additional information regarding new and alternative features. For example, the expanded information may include interactive step-by-step instructions to guide a user through a workflow for the new or alternative feature. Details regarding these and other aspects of rules-based work flow messaging are described in the following discussion.

In accordance with techniques described in this document, users can be alerted regarding application program features that may be of interest to the users as the user is attempting to accomplish a related task. Moreover, if a user shows interest through interaction with a messaging element or otherwise, a dialog can be launched to teach the user about the available feature and additionally provide interactive instructions in some scenarios. Accordingly, workflow messaging techniques as discussed herein provide an efficient mechanism to promote new features to users and show the users how to use the features in an interactive manner. This can increase user satisfaction with the application and ultimately result in a favorable perception of the application and a developer/provider corresponding to the application.

Having considered an example environment, consider now a discussion of some example details of techniques for rules-based work flow messaging in accordance with one or more implementations.

Rules-Based Workflow Messaging Implementation Details

Figure 2:
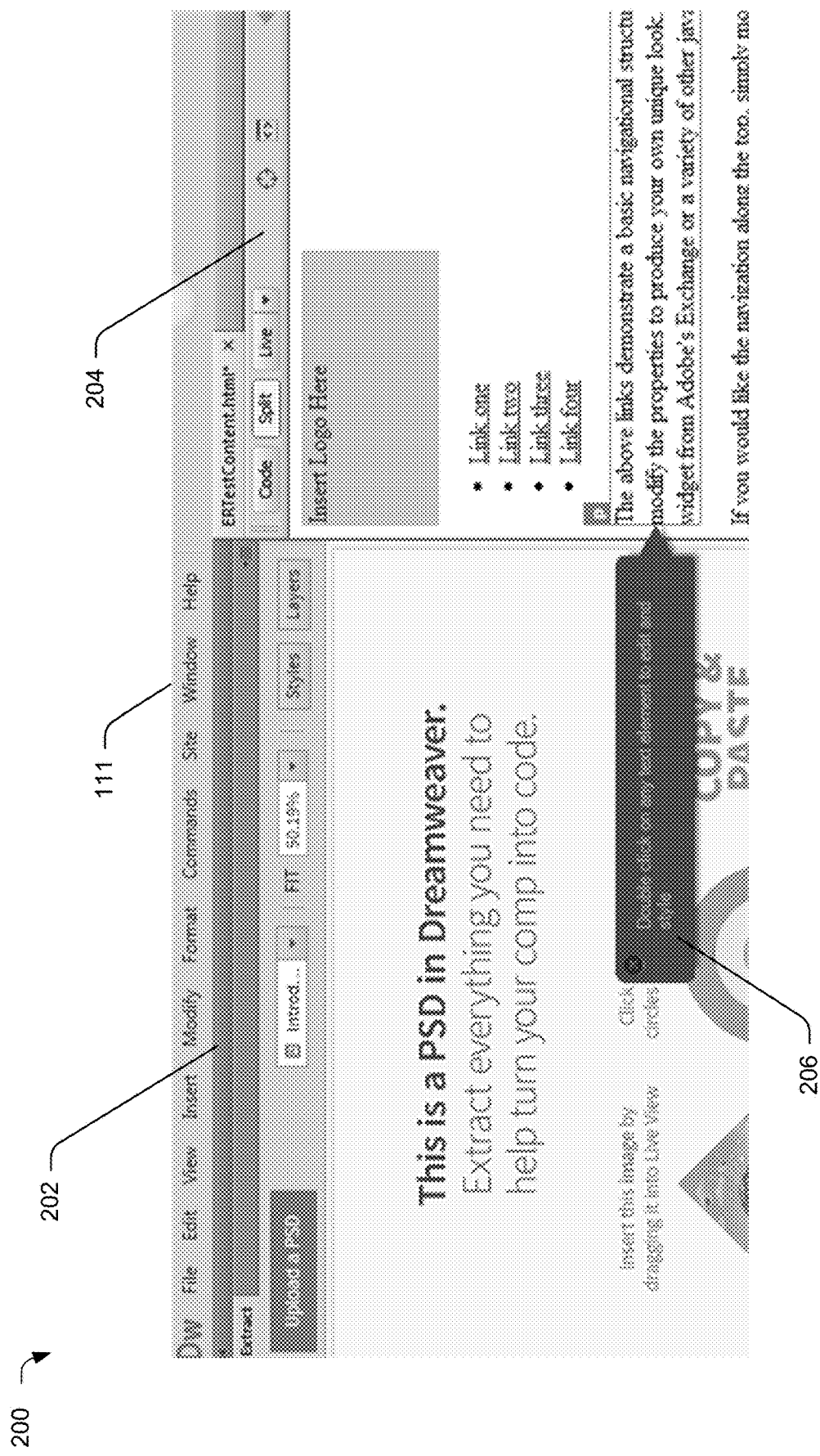
FIG. 2 illustrates an example user interface in accordance with one or more implementations.

This section describes some example details of rules-based work flow messaging in accordance with one or more implementations. In particular, FIG. 2 depicts generally at 200 an example representation of a user interface 111 that may be employed to implement techniques for rules-based workflow messaging described herein. In this example, the user interface 111 is configured to enable editing of a mark-up language document or page using various tools associated with a page editor module 110 accessible via the user interface. It should also be noted that while aspects of the inventive techniques are described in relation to a page editor module 110, the concepts described herein are not limited to page editing or web development application. Comparable techniques to provide workflow messaging for feature discovery can be employed with various different types of applications including but not limited to productivity applications, image editing applications, communication applications, analytics applications, and multimedia applications, to name a few examples. Thus, the page editor module 110 is discussed herein as but one illustrative example of an application that can take advantage of workflow messaging techniques to facilitate discovery of available features.

In the depicted example, a split view user interface is illustrated as having both a structure view 202 and a rendered view 204 of a page. The split view may be configured to simultaneously display the structure view 202 and the rendered view 204 and to reflect edits made via the user interface 111 substantially in real time across both the structure view 202 and the rendered view 204. Naturally, the structure view 202 and the rendered view 204 may also be provided via different windows and in separate user interfaces associated with different applications or processes. For example, the rendered view 204 may be constructed using a browser or other client application module 108 that is external to the page editor module 110. As mentioned, the structure view 202 and rendered view 204 may be associated with different respective processes.

Edits may be made visually via the rendered view 204 (e.g., design view) as well as by direct coding within the hierarchal representation presented in the structure view 202. Edits made in one view are populated to the other view and vice versa. The updates to the different views may occur substantially in real-time, such that a viewer observes little or no noticeable delay between edits made via one view and rendering of changes in the other view(s). Other views are also contemplated, such as an interface providing a structured view only or a rendered view only.

The example user interface 111 of FIG. 2 additionally illustrates use of workflow messaging as discussed above and below. In particular, an example message 206 in the form of a pop-up message box is depicted. The message 206 is representative of various kinds of notifications that may be exposed via a user interface 111 to inform users regarding available features including newly added features and alternative features that can be used to employ a task. Various kinds of visual elements to expose messages are contemplated. Messages such as the message 206 can be triggered based upon rules created to control when and how to show the messages. As noted, messages can be triggered by matching a pattern of interaction with the application (e.g., a sequence of action) to a corresponding pattern and/or criteria specified by messaging rules. In the particular example of FIG. 2, the message 206 is indicative of an element editing feature for the page editor module 110 that allows a user to edit element properties and style by double clicking on the element in the split view (e.g., live view). In this example, the message 206 is triggered responsive to recognition of using a prior technique such as switching between separate views to accomplish the editing task. Here, the editing feature is made available via the split view so a user is able to preview changes immediately in the rendered view 204 without having to switch back and forth. Accordingly, the workflow messaging is designed to inform the user of the available option to double click for editing. If the user selects the message 206 or otherwise provides input to show interest in the new feature, additional messages and/or an interactive dialog can be exposed in any suitable way to walk to the user through the new feature in detail. As noted, this may involve showing step-by-step instructions detailing the workflow actions for the new feature.

Figure 3:
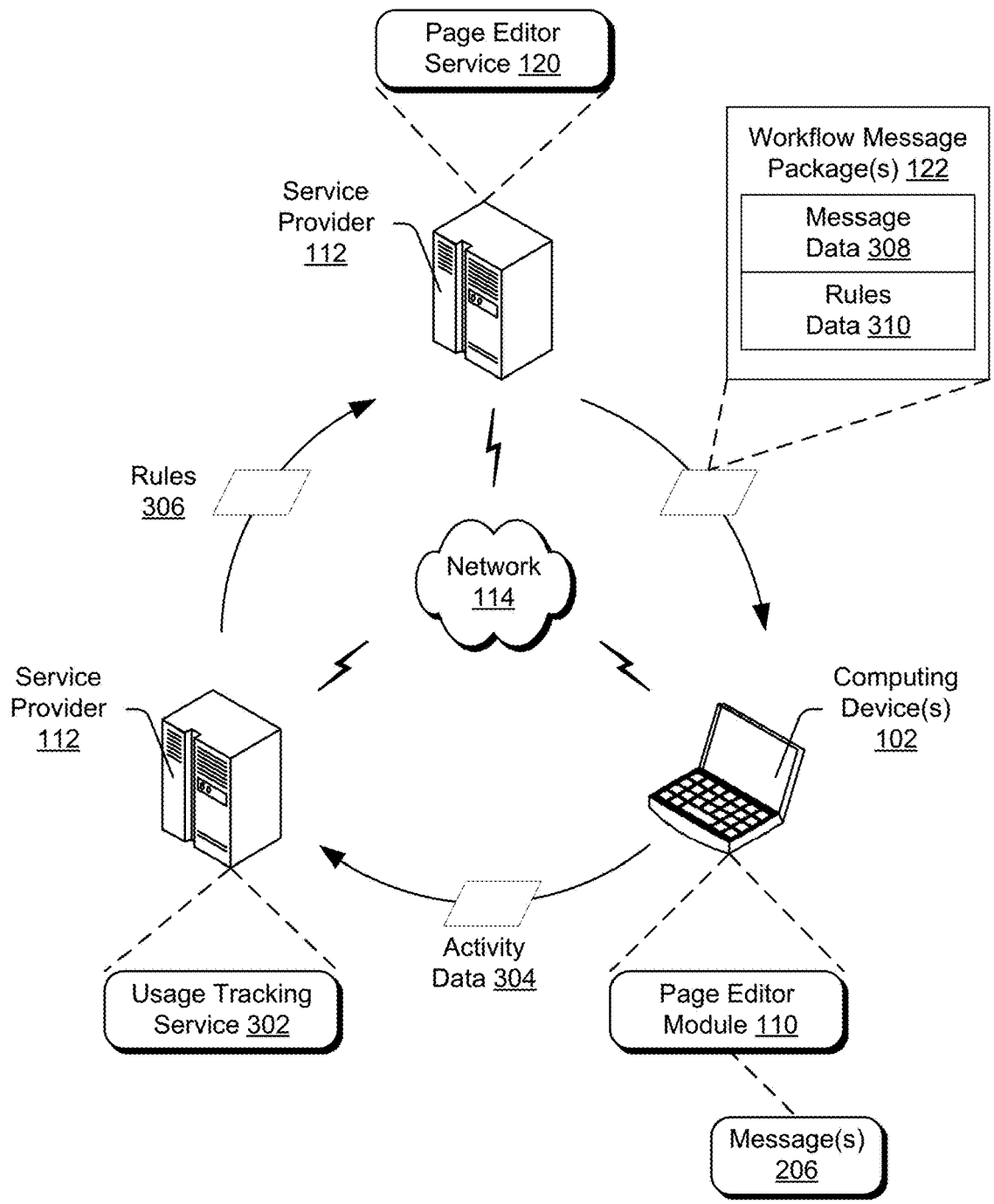
FIG. 3 illustrates an example scenario showing interaction between components in accordance with one or more implementations.

To further illustrate, FIG. 3 depicts generally at 300 an example scenario showing interaction between components in accordance with one or more implementations. In the illustrated example, a system for implementing rules-based workflow messaging is depicted that includes a computing device 102 that is coupled over a network 114 to a service provider 112 as described in relation to the example environment of FIG. 1. In this example, the service provider 112 is illustrated as implementing a usage tracking service 302 as a component that is separate from the page editor service 120. Functionality represented by the usage tracking service 302 may be implemented by a separate server associated with the service provider 112 or by a different provider. Alternatively, the usage tracking service 302 may be an integrated component of the page editor service 120.

Generally speaking, the usage tracking service 302 is designed to collect activity data 304 from client computing devices regarding interaction with a particular application, such as the page editor module 110. The usage tracking service 302 can aggregate activity data 304 from multiple devices and users to produce a database of usage data. To account for privacy concerns, the activity data 304 can be collected anonymously and additionally users may be able to opt in or out of usage tracking. In order to facilitate the tracking, the page editor module 110 can be configured to instrument various features of interest with tracking code. The tracking code is designed to record user interaction with particular features including identification of features that are used and not used, statistical data regarding the interactions (e.g., frequency, usage counts, time of use, time of interaction to first use, etc.), and contextual information such as time/date, editing context, document characteristics, user data, and so forth. The tracking code enables monitoring of user behavior such as mouse clicks, item selections, feature usage, editing operations, and other interaction with the application. Collected activity data 304 is then communicated for storage in a usage database and/or processing by the service provider 112.

For example, the usage tracking service 302 may be configured to obtain the activity data 304 from clients and may be further configured to analyze the data to identify different interaction patterns and workflows. In particular, the usage tracking service 302 can distinguish between features and workflows that are used frequently and those that are not used very often. This enables identification of underutilized features and workflows that are not being discovered and utilized by users of the application.

The usage tacking service 302 additionally represents functionality operable to analyze activity data 304 and derive corresponding rules 306 related to available features. Rules can be created that correspond to underutilized features that are recognized as being not readily discovered. Rules can also be generated for selected features that a developer or provider decides to promote, such as new features that are implemented in a product update or new version of an application. Rules that are produced can be supplied for use by the page editor service 120 to enable distribution of the rules to client computing device. For example, the rules may be included in a rules database that is integrated with, accessible to, managed by and/or otherwise available for use by the page editor service 120.

Rules 306 are designed to match interaction patterns that users engage in with the application to new features and workflows. For example, a rule may specify a series of actions for a prior, "legacy" workflow that when recognized trigger messaging regarding an alternative feature that is matched to the series of actions. A new workflow for the alternative feature provides a different mechanism for accomplishing a task the user is undertaking. In at least some cases, the alternative feature is designed to accomplish the task with a reduced number of steps and/or in an enhanced way relative to the series of actions for the legacy workflow.

By way of example, a rule can be designed to promote a new toolbar feature for element editing in a page editor that is accessible via a selectable icon. The new toolbar feature may be linked to a legacy approach such as using menu navigation to launch a comparable editing toolbar. Thus the new toolbar is more readily available and can facilitate more efficient editing. In this example, the rule can specify menu interaction and selections related to the legacy approach (e.g., series of menu actions) that when recognized trigger messaging related to the new toolbar feature. Messaging content, animations, UI elements and graphics for messaging related to the new toolbar feature are contained in a rules package obtained for the feature and installed into a rule library implemented by the client (e.g., a rules file, database table, or other suitable data structure). For example, the rules package can include a notice regarding the selectable icon for the new toolbar feature and a graphic, such as an arrow animation, to show the location of the icon. Thus, when a user engages in actions for the legacy approach, the actions are recognized based on the installed rule. Then, corresponding messaging including the notice and/or arrow animation can be launched to instruct the user regarding the new toolbar feature that may be used as an alternative to the legacy approach.

In implementations, a rule server can be included with or invoked by the page editor service 120 to deploy rules and updates to the rules to client applications. Rules can be delivered automatically by the rule server on a designated schedule or on-demand responsive to periodic requests from clients to check for updated rules. In any case, a set of initial rules can be installed with a version of the page editor module 110 (or other application) and can then be dynamically updated thereafter based on activity data analysis and generation of new rules subsequent to release and deployment of the application to client devices.

In one or more implementations, rules 306 are distributed to client applications by way of workflow message packages 122 that are configured by the page editor service 120, rules server, or comparable service. As represented in FIG. 3, workflow message packages 122 are configured to contain message data 308 that defines messages to show in relation to particular features as well information sufficient to implement interactive dialogs and/or step-by-step instructions for messages designed to support the dialogs and instructions. The workflow message packages 122 also include rules data 310 that represent the rules definitions and criteria used to match rules to user activity and selectively launch corresponding workflow messages when matches are detected. Thus, workflow message packages 122 can be downloaded and corresponding rules are installed by the page editor module 110 (or other application). Then, activity is tracked and when criteria for a rule are satisfied, corresponding workflow messaging is initiated and appropriate messages 206 are exposed to notify use regarding features.

Having discussed example details of the workflow messaging techniques, consider now some example procedures to illustrate additional aspects of the described techniques.

Example Procedures

This section describes example procedures in accordance with one or more implementations of rules-based workflow message. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that includes or makes use of a page editor module 110 or a client application module 108. Aspects of the procedures may also be performed via services and web applications, such as services provided by a service provider 112 over a network 114, examples of which include a page editor service 120 and a usage tracking service 302 as discussed herein.

Figure 4:
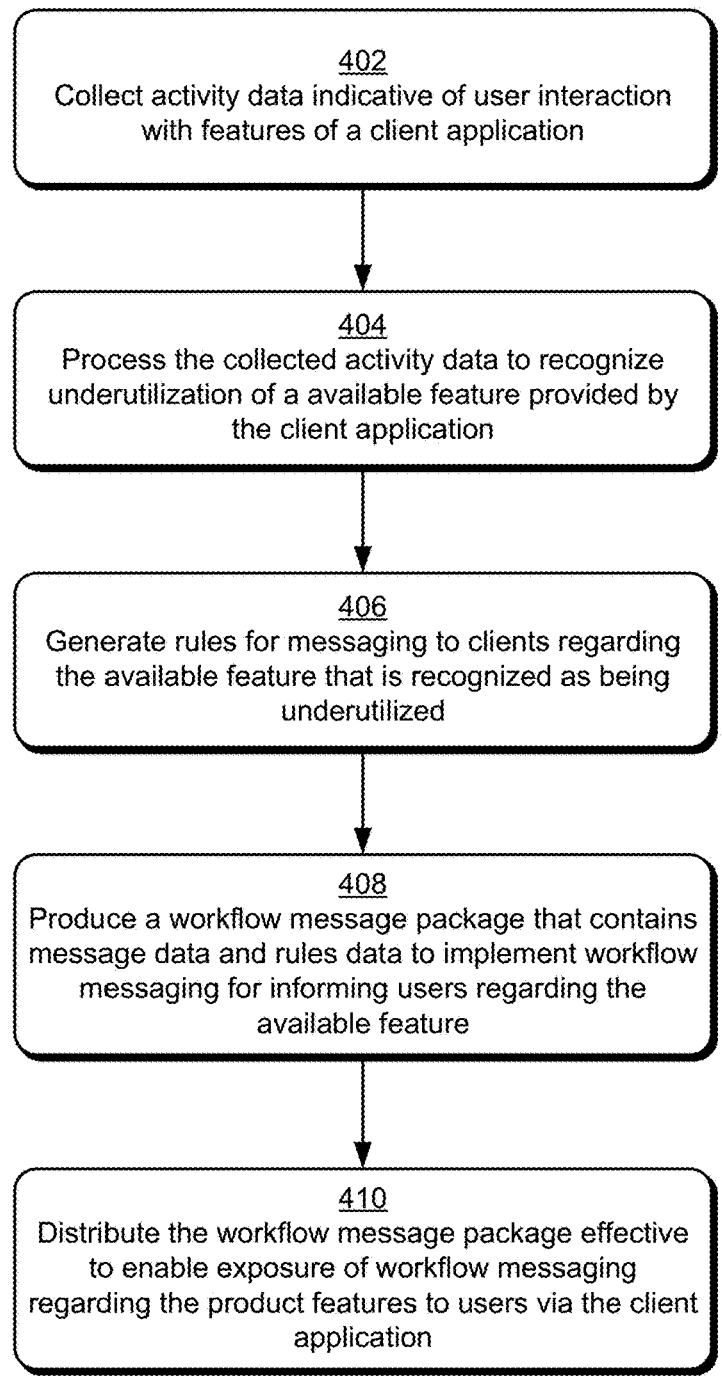
FIG. 4 is a flow diagram depicting an example procedure for rules-based workflow messaging in accordance with one or more implementations.

FIG. 4 is a flow diagram depicting an example procedure 400 for rules-based workflow messaging in accordance with one or more implementations. Activity data is collected that is indicative of user interaction with features of a client application (block 402). For example, a usage tracking service 302 implemented via a service provider 112 can be used to obtain data from client device that describes user interaction with various features of an application. In one approach, the application is instrumented to include tracking code designed to generate and supply various kinds of activity data associated with user interaction with particular features. As noted, the client application may be configured as a page editor application for editing of a mark-up language document. Other types of applications are also contemplated. Activity data obtained through tracking can include identification of features that are used and not used, statistical data regarding the interactions (e.g., frequency, usage counts, time of use, time of interaction to first use, etc.), and contextual information such as time/date parameters, editing context, document characteristics, user data, and so forth. The application is configured to supply activity data for processing by the service provider 112.

In particular, the collected activity data is processed to recognize underutilization of an available feature provided by the client application (block 404). Then, rules are generated for messaging to clients regarding the available feature that is recognized as being underutilized (block 406). For example, the usage tracking service 302 can collect activity data supplied by applications and use the data to derive rules for workflow messaging. Collection of the activity data may involve aggregating activity data from multiple devices and users to produce a database of usage data for different features of the client application. This usage data is configured to include statistical information for the different features including one or more of frequency of use, percentage usage across multiple users, number of times used collectively by multiple users, number of uses by individual users, amount of time used, and interaction time before first use, to name a few examples.

Rules can be derived based upon thresholds established for one or a combination of different parameters. By way of example, threshold levels for percentage usage or number of uses can be set to control when rules for features are generated. In this example, if usage is below the established percentage usage or number of uses, this is interpreted as an indication that the feature is underutilized and may be difficult for users to discover on their own. In response, rules are created to activate workflow messaging to promoter the feature.

Thus, processing of collected activity data may include filtering of the collected activity data to obtain usage data for available features that indicates usage of the features is below a threshold level set to control when rules for features are generated. Rules are then generated to implement workflow messaging for features identified as being underutilized. Generally, the rules are associated with particular "legacy" workflows and existing product features. The rules specify criteria to detect when a user is engaging in activity for the legacy workflow and set trigger conditions for when to launch workflow messaging for an available feature that provides an alternative way to accomplish comparable tasks. Thus, the rules effectively match legacy workflows to different available features that provide new and/or different ways to complete tasks that users may not be fully informed about. Generally, the available features represent enhanced ways to interact with application functionality that may be faster, easy, and more effective than legacy interactions. Thus, notifying users regarding these features and teaching the users how to use the feature can increase user satisfaction with the applications and result in positive opinions regarding the application developer/provider.

Rules may be configured to specify the context in which corresponding messaging is activated. In some cases, messaging is provided after a designated number of interactions with a legacy workflow for a task occurs, such as after three or five instances. This provides a cushion before workflow messaging is launched that may allow some users to discover features on their own, in which case messaging is not activated. Additionally, rules can specify that workflow messaging for a particular feature is activated if a user has not yet used the particular feature and then deactivated after a designated number of uses (e.g., deactivate after first use or after "x" number of uses). This prevents continued messaging from occurring for features users are already aware of since users are likely to find messaging for features they already know how to use unhelpful and distracting.

In implementations, rules can be packaged with information defining message content, notifications, and details regarding the types of messages and visual elements to use to provide information on available features to users. In this approach, a workflow message package is produced that contains message data and rules data to implement workflow messaging for informing users regarding the available feature (block 408) and the workflow message package is distributed effective to enable exposure of the available feature to users via the client application (block 410). In general, the workflow message package can be configured in any suitable way to enable addition of rules for the available feature dynamically to a rules library implemented by the client application. The rules library can contain pre-defined rules that are either included as initial rules for the deployed application or previously added to the initial rules. The workflow message package enables additional rules to be added to the rules library after release and deployment. In particular, workflow message packages are formatted to enable installation of new rules dynamically into the rules library.

By way of example and not limitation, workflow message packages may provide script, content, and mark-up language that can be unpacked and loaded dynamically via an extensibility component of the application. For example, the application may include an extensibility component that uses JavaScript or another suitable scripting language to facilitate interaction between the application and a rules server component to distribute workflow message packages and dynamically install rules defined by the workflow message packages. In this way, the rules library is configured to support and include a combination of pre-defined rules integrated with a release of the client application and rules that are built dynamically and added to the rules library after the release of the client application for underutilized features recognized through analysis of collected activity data.

As noted, workflow message packages can be configured to include message data 308 and rules data 310 in a format that can be recognized, loaded, installed and otherwise utilized by an application, such as a page editor module 110 described in various examples herein. The message data contained in a workflow message package includes mark-up language code that defines message content and visual elements used to expose the workflow messaging for the available feature via a user interface of the client application. Further, the message data can define one or more notification messages to inform users of the application regarding the available features. Moreover, the message data can define multiple sequential messages to provide step-by-step instructions to guide users through a workflow for a corresponding feature.

The rules data contained in a workflow message package is configured to specify criteria to trigger the workflow messaging for the available feature in response to detection of user activity indicative of a legacy workflow corresponding to the available feature. Various criteria are contemplated. Examples of criteria used to trigger workflow messaging include but are not limited to identification of actions included in a legacy workflow, an indication of whether the available feature has been previously used, and a number of times of legacy workflow usage specified for activation of workflow messaging.

Figure 5:
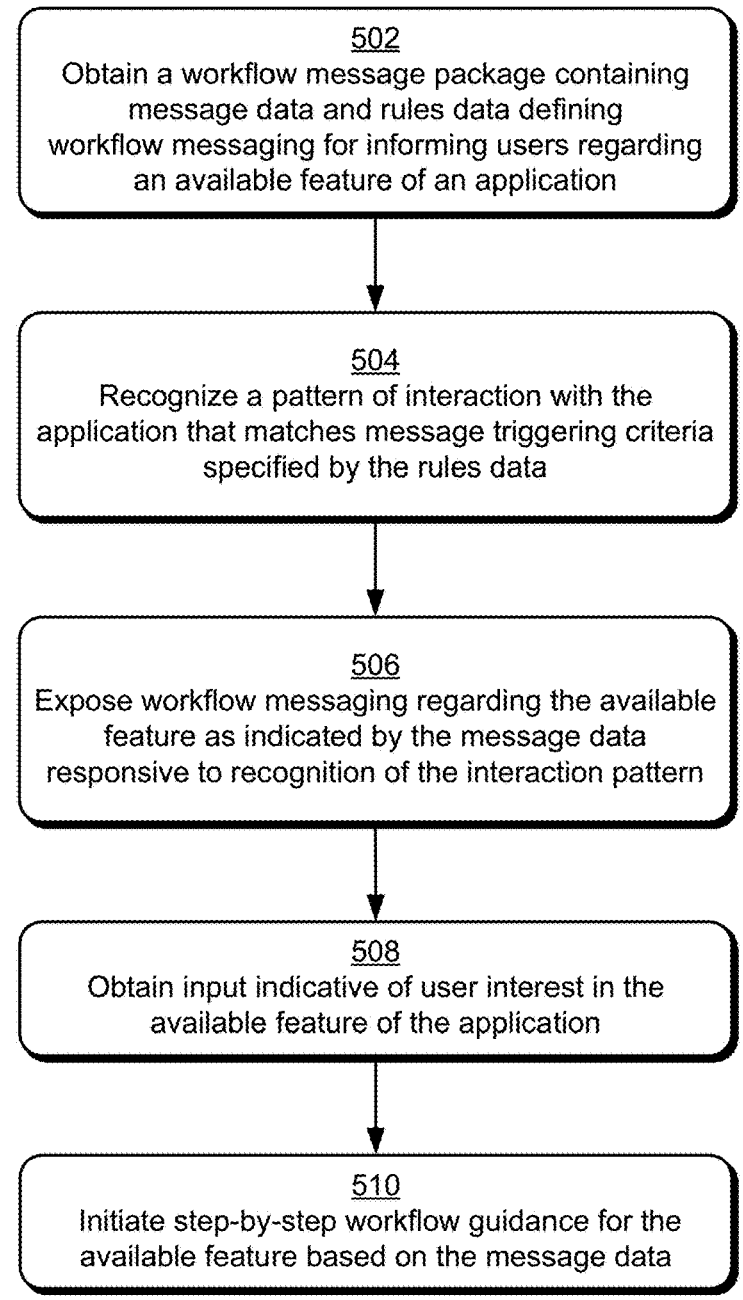
FIG. 5 is a flow diagram depicting an example procedure for utilizing workflow message packages at a client in accordance with one or more implementations.

FIG. 5 is a flow diagram depicting an example 500 procedure for utilizing workflow message packages at a client in accordance with one or more implementations. A workflow message package is obtained that contains message data and rules data to implement workflow messaging for informing users regarding an available feature of an application (block 502). For example, a service provider 112, through a page editor service 102 or otherwise, can operate to create and distribute workflow message packages 122 in various ways as described throughout this document. The workflow message packages can include message data and rules data as previously described herein. Workflow message packages can be obtained by applications as periodic, regular updates that are initiated by the service provider 112. In addition or alternatively, rules can be downloaded on-demand via update functionality integrated with the application, such as selection of a button or other control to initiate a rules update from the client application. Once downloaded, workflow message packages are used to update the rules library and begin enforcement of rules for available features as defined by the workflow message packages.

To enforce rules, a pattern of interaction with the application is recognized that matches message triggering criteria specified by the rules data (block 504). Here, a legacy workflow mapped to a new or alternative feature can be recognized based upon rules data contained in the rules library. The rules data may indicate various actions involved in the legacy workflow and specify how many of the actions must occur to characterize user interaction as being directed to the legacy workflow. Other triggering criteria can also be defined and checked, such as checking whether an available feature has already been used for a first time and determining a number of uses for both the available feature and the corresponding legacy work flow. When criteria and conditions specified by the rules are satisfied, workflow messaging regarding the available feature is triggered.

Assuming relevant criteria is specified, workflow messaging regarding the available feature is exposed as indicated by the message data responsive to recognition of the interaction pattern (block 506). When workflow messaging is activated, notifications regarding the available feature can be presented in various ways using one or more kinds of visual elements, individually or in different combinations. For example, exposing workflow messaging can be accomplished by outputting of one or more visual elements in a user interface for the application that are configured to display notifications and instructions regarding the available feature. Some examples of suitable visual elements that can be employed to implement workflow messaging are discussed throughout this document. Once messaging is exposed, a user can choose to ignore the message and/or take no action at all with respect to the feature indicated by the messaging. On the other hand, a user can express at least some interest in the feature through interaction with messaging such as by selecting the visual element, changing focus to the message, expanding the UI, making a selection associated with the message, or otherwise providing input to express interest.

Accordingly, in some scenarios, input is obtained that is indicative of user interest in the available feature of the application (block 508) and step-by-step workflow guidance is initiated for the available feature based on the message data (block 510). For instance, at least some visual elements can be configured as interactive elements that a user can engage with to access additional information regarding a feature indicated by the element. Thus, interaction with a notification message can launch an interactive mode in which additional information, tutorials, and step-by-step instructions for features can be provided. Step-by-step instructions can be provided as a sequence of messages that are triggered based on user action taken in response to the messaging. For example, completion of a first action for a workflow specified by a first message can trigger a second message indicating a second action to take for the workflow. Then, completion of the second action triggers a third message, and so on until the workflow is completed. In another approach, detailed information and instructions for features are provided in the form of an instructive dialog or rendered document that covers steps for completion of the workflow as an integrated guide (e.g., without using a sequence of messages tied to user actions). In this approach, users can navigate the integrated guide as they choose to learn about the corresponding feature(s) and individual actions for the workflow.

Having described example procedures in accordance with one or more implementations, consider now a discussion of example systems and devices that can be utilized to implement the various techniques described herein.

Example System and Device

Figure 6:
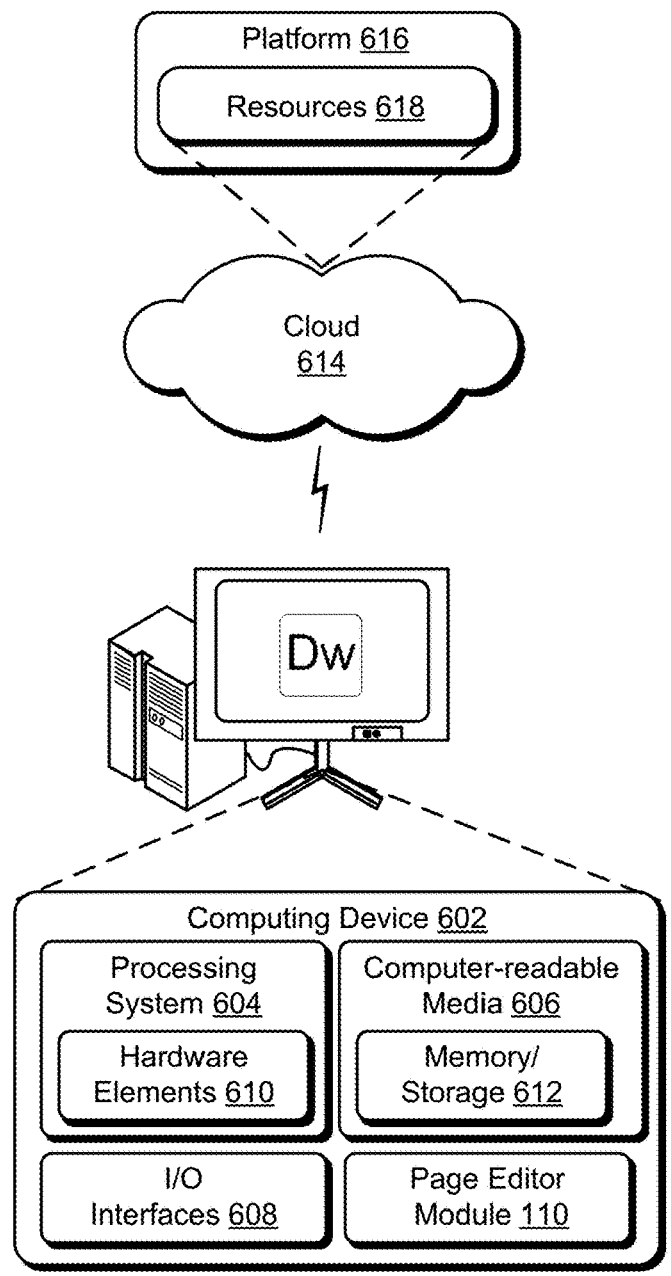
FIG. 6 illustrates an example system including various components of an example device that can be employed for one or more implementations described herein.

FIG. 6 illustrates an example system generally at 600 that includes an example computing device 602 that is representative of one or more computing systems or devices that may implement the various techniques described herein. This is illustrated through inclusion of the page editor module 110, which operates as described above. The computing device 602 may be, for example, a server of a service provider, a device associated with a client (e.g., a client device), an on-chip system, and any other suitable computing device or computing system.

The example computing device 602 is illustrated as including a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and devices that enable persistent and non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and logic embodied on some form of computer-readable storage media or by one or more hardware elements 610. The computing device 602 may be configured to implement particular instructions and functions corresponding to the software and hardware modules. Accordingly, implementation of a module that is executable by the computing device 602 as software may be achieved at least partially in hardware, e.g., through use of computer-readable storage media and hardware elements 610 of the processing system 604. The instructions and functions may be executable/operable by one or more articles of manufacture (for example, one or more computing devices 602 and processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes or is representative of a platform 616 for resources 618. The platform 616 abstracts underlying functionality of hardware (e.g., servers) and software resources of the cloud 614. The resources 618 may include applications and data that can be utilized while computer processing is executed on servers that are remote from the computing device 602. Resources 618 can also include services provided over the Internet as well as through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although techniques have been described in language specific to structural features and methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a computing device, the method comprising:
   collecting activity data indicative of user interaction with features of a client application;
   activating workflow messaging after a designated number of interactions with a legacy workflow corresponding to an available new feature provided by the client application;
   processing the collected activity data to recognize underutilization of the available new feature;
   generating rules for messaging to clients regarding the available new feature that is recognized as being underutilized;
   distributing a workflow message package effective to enable exposure of the available new feature to users via the client application; and
   deactivating the workflow messaging after a designated number of uses of the available new feature.

2. The method of claim 1, wherein processing the collected activity data comprises filtering of the collected activity data to obtain usage data for the available new feature that indicates usage of the available new feature is below a threshold level set to control when rules for features are generated.

3. The method of claim 1, wherein the workflow message package is configured to enable addition of rules for the available new feature dynamically to a rules library implemented by the client application, the rules library configured to include a combination of pre-defined rules integrated with a release of the client application and rules that are built dynamically and added to the rules library after the release of the client application for underutilized features recognized through analysis of the collected activity data.

4. The method of claim 1, wherein collecting the activity data comprises aggregating activity data from multiple devices to produce a database of usage data for different features of the client application.

5. The method of claim 4, wherein the usage data includes statistical information for the different features including one or more of frequency of use, percentage usage across multiple users of the users, number of times used collectively by the multiple users of the users, number of uses by individual users of the users, amount of time used, or interaction time before first use.

6. The method of claim 1, wherein the workflow message package has message data including mark-up language code that defines message content and visual elements used to expose the workflow messaging for the available new feature via a user interface of the client application.

7. The method of claim 1, wherein the workflow message package has message data that defines one or more notification messages to inform the users of the client application regarding the available new feature.

8. The method of claim 1, wherein the workflow message package has message data that defines multiple sequential messages to provide step-by-step instructions to guide the users through a workflow for the available new feature.

9. The method of claim 1, wherein the workflow message package has rules data configured to specify criteria to trigger the workflow messaging for the available new feature in response to detection of user activity indicative of the legacy workflow corresponding to the available new feature.

10. The method of claim 9, wherein the criteria to trigger the workflow messaging include at least identification of actions included in the legacy workflow, an indication of whether the available new feature has been previously used, and a number of times of legacy workflow usage specified for activation of workflow messaging.

11. The method of claim 1, wherein the client application comprises a page editor application for editing of a mark-up language document.

12. The method of claim 11, wherein the workflow messaging is exposed via an editing user interface for the page editor application including options to view a document object model (DOM) structure view and a rendered view of the mark-up language document.

13. One or more computer-readable storage media comprising instructions stored thereon that, responsive to execution by a computing device, cause operations to implement workflow messaging for an application of the computing device including:
obtaining a workflow message package containing message data and rules data defining the workflow messaging for informing users regarding an available new feature of the application;
activating the workflow messaging after a designated number of interactions with a legacy workflow corresponding to the available new feature;
exposing the workflow messaging regarding the available new feature as indicated by the message data responsive to recognition of a pattern of interaction with the application; and
deactivating the workflow messaging after a designated number of uses of the available new feature.

14. One or more computer-readable storage media as described in claim 13, wherein the operations to implement the workflow messaging for the application further include obtaining an input indicative of user interest in the available new feature of the application and initiating step-by-step workflow guidance for the available new feature based on the message data.

15. One or more computer-readable storage media as described in claim 13, wherein exposing the workflow messaging comprises causing output of one or more visual elements in a user interface for the application configured to display notifications and instructions regarding the available new feature.

16. One or more computer-readable storage media as described in claim 13, wherein the operations to implement the workflow messaging for the application further include:
generating activity data by tracking user interaction with features of the application;
communicating the activity data to a usage tracking service available via a service provider to facilitate recognition of underutilized features and generation of corresponding rules to implement the workflow messaging for the underutilized features; and
obtaining a workflow client package via a rules service implemented by the service provider, the workflow client package reflecting rules built for the available new feature responsive to recognition of the available new feature as being underutilized by the usage tracking service based on activity data supplied by multiple users of the users; and
dynamically adding the rules for the available new feature to a rules library implemented by the application.

17. A computing system comprising:
one or more processing devices;
one or more computer-readable media storing instructions that, responsive to execution by the one or more processing devices, cause the computing system to perform operations to implement workflow messaging for a client application including:
collecting activity data indicative of user interaction with features of the client application;
activating the workflow messaging after a designated number of interactions with one or more legacy workflows corresponding to one or more available new features provided by the client application;
processing the collected activity data to recognize underutilization of the one or more available new features;
generating rules for messaging to clients regarding the one or more available new features that are recognized as being underutilized, the rules generated for inclusion in a rules library implemented by the client application and configured to include a combination of pre-defined rules integrated with a release of the client application and rules dynamically built for features recognized as being underutilized after the release;
distributing the rules effective to enable exposure of the one or more available new features to users via the client application; and
deactivating the workflow messaging after a designated number of uses of the one or more available new features.

18. The computing device as described in claim 17, wherein the rules specify criteria to trigger the workflow messaging for the one or more available new features in response to detection of user activity indicative of the one or more legacy workflows corresponding to the one or more available new features.

19. The computing device as described in claim 18, wherein processing the collected activity data to recognize underutilization includes identifying features for which usage across multiple users of the users is below a threshold level set to control when rules for features are generated.

20. The computing device as described in claim 19, wherein distributing the rules comprises communicating the rules as workflow message packages designed to enable dynamic updating of the rules library to account for rules produced subsequent to release of the client application.

* * * * *